United States Patent
Bouthinon et al.

(10) Patent No.: US 10,050,678 B2
(45) Date of Patent: Aug. 14, 2018

(54) RADIOFREQUENCY TRANSMISSION DEVICE

(71) Applicants: CONTINENTAL AUTOMOTIVE FRANCE, Toulouse (FR); CONTINENTAL AUTOMOTIVE GmbH, Hannover (DE)

(72) Inventors: Jean-Christophe Bouthinon, Cugnaux (FR); Dawid Durka, Toulouse (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 15/477,574

(22) Filed: Apr. 3, 2017

(65) Prior Publication Data
US 2017/0207826 A1    Jul. 20, 2017

Related U.S. Application Data

(63) Continuation-in-part of application No. 15/198,080, filed on Jun. 30, 2016, now abandoned.

(51) Int. Cl.
*H04B 1/38* (2015.01)
*H04B 5/02* (2006.01)
(Continued)

(52) U.S. Cl.
CPC .......... *H04B 5/02* (2013.01); *B60C 23/0447* (2013.01); *B60C 23/0455* (2013.01); *H04B 1/38* (2013.01);
(Continued)

(58) Field of Classification Search
None
See application file for complete search history.

(56) References Cited

U.S. PATENT DOCUMENTS 4,067,235 A    1/1978  Markland et al.
6,169,339 B1 *  1/2001  Cripe .................... B60R 21/017
                                                 280/735
(Continued)

FOREIGN PATENT DOCUMENTS

EP    2741368    6/2014
WO    0047429    8/2000

OTHER PUBLICATIONS

France Search Report, dated Apr. 6, 2016, from corresponding France application.

*Primary Examiner* — Mohammed Rachedine
(74) *Attorney, Agent, or Firm* — Young & Thompson

(57) ABSTRACT

A radiofrequency transmission device (D') includes: a transmission unit (10) for transmitting a voltage signal (S) in pulsed form; a radiofrequency antenna (A); filtering elements (30'); and a voltage source (Vcc), wherein the filtering elements (30') include:

"n" coils ($B_1, B_2, \ldots B_n$), electrically connected in series, of which (n−1) coils each have a natural resonance frequency such that:

$$f_{RLi} = i \times f_F$$

each having an inductance ($L_i$) such that, at the predetermined fundamental frequency:

$$L_{TOT} = L_1 + L_2 + \ldots L_i + \ldots L_n = Z_{TOT} = Z_1 + Z_2 + \ldots Z_i + \ldots Z_n$$

and $$L_i = Z_i$$

where
$f_{RLi}$ Is the natural resonance frequency of the i-th coil
i is a number varying from 2 to n,
$L_{TOT}$ is the total inductance of the n coils,
$L_i$ is the inductance of the i-th coil, (Continued)

$Z_{TOT}$ is the total impedance of the n coils,
$Z_i$ is the impedance of the i-th coil,
n is an integer greater than zero.

6 Claims, 3 Drawing Sheets

(51) Int. Cl.
*H04M 1/725* (2006.01)
*H04W 4/20* (2018.01)
*B60C 23/04* (2006.01)
*H04B 5/00* (2006.01)
*H04W 4/04* (2009.01)
*H04W 4/80* (2018.01)
*G01S 13/93* (2006.01)

(52) U.S. Cl.
CPC ........ *H04B 5/0081* (2013.01); *H04M 1/7253* (2013.01); *H04W 4/046* (2013.01); *H04W 4/20* (2013.01); *H04W 4/80* (2018.02); *G01S 2013/9346* (2013.01); *H04M 2250/04* (2013.01)

(56) References Cited

U.S. PATENT DOCUMENTS

| | | |
|---|---|---|
| 2005/0134448 A1 | 6/2005 | Perlman et al. |
| 2010/0203844 A1 | 8/2010 | Gorbachov |
| 2011/0058623 A1 | 3/2011 | Segoria et al. |
| 2015/0180593 A1 | 6/2015 | Hamilton et al. |
| 2016/0204500 A1* | 7/2016 | Orihara .................... H01Q 1/38 343/702 |

* cited by examiner

RADIOFREQUENCY TRANSMISSION DEVICE

BACKGROUND OF THE INVENTION

Field of The Invention

The invention relates to a radiofrequency transmission device. The term "radiofrequency transmission device" is taken to mean any "hands free" access badge for accessing a motor vehicle, which communicates by radio waves with an on-board electronics unit in said vehicle, in order to unlock the doors of the vehicle without any need for the user to actuate the doors of said vehicle manually; the badge may take the form of either a card or a mobile phone.

Description of The Related Art

The term "radiofrequency transmission device" is also taken to mean a tire pressure sensor of a motor vehicle, either attached to the rim of a wheel of said vehicle, or placed in the tread of a tire of the vehicle. Said tire pressure sensor communicates by radio waves with a central on-board electronics unit in the vehicle in order to send pressure (and temperature) measurements made by said sensor in the tire to said unit, thus warning the user of any under-inflation of the tire.

Said radiofrequency transmission devices transmit radio waves at a predetermined nominal transmission frequency, referred to herein as the fundamental frequency $f_F$.

A radiofrequency transmission device D of this type is shown in FIG. 1, and takes the form of an electronic circuit comprising, among other components:

a voltage supply source Vcc, which may be, for example, a battery, or the voltage drawn from the vehicle battery,
 a transmission unit 10 for transmitting a voltage signal S, comprising an oscillator and a power amplifier,
 a radiofrequency antenna A,
 matching means M1 for matching the transmission frequency of the antenna A to the value of the predetermined fundamental frequency $f_F$)
 filtering means 30, generally comprising at least one band-pass filter.

The transmission frequency matching means generally comprise:

a matching coil L, connected electrically in series with:
  a first matching unit 20, to match the frequency of the power amplifier of the transmission unit 10 to the fundamental frequency $f_F$, supplied by the voltage source Vcc and connected, on the one hand, to said transmission unit 10, and, on the other hand, to the filtering means 30. Said first matching unit 20 generally comprises (see FIG. 2) at least a first matching capacitor C1 connected to the supply source Vcc and to the ground, a coil Lx connected to the supply source Vcc and to a junction point J, a second matching capacitor C2 connected to the junction point J and to the ground, and a third capacitor C3 connected to the junction point J and to the input of the filtering means 30,
  and a second matching unit 40 for matching the transmission frequency of the antenna A, connected to the output of the filtering means 30, comprising one or more matching capacitors (not shown), and connected electrically to the radiofrequency antenna A.

Said radiofrequency transmission device D is known to those skilled in the art and will not be detailed further here.

The transmission unit 10 is supplied with voltage by the voltage supply source Vcc, and generates a pulsed voltage signal S (FIG. 1) whose predetermined fundamental frequency $f_F$ is substantially equal, because of the transmission frequency matching means M1, to the nominal transmission frequency of the antenna A of the radiofrequency transmission device D.

The generation of this pulsed voltage signal S is accompanied by the parallel generation of harmonic parasitic currents, that is to say periodic parasitic voltage signals whose frequencies are multiples of the predetermined fundamental frequency $f_F$, that is to say frequencies equal to 2, 3, 4, and 5 times the predetermined fundamental frequency $f_F$.

Said parasitic voltage signals are propagated throughout the electronic circuit of the radiofrequency transmission device D, and make the electronic circuit resonant. More precisely, the radiofrequency transmission device D then transmits radio waves at other undesired parasitic frequencies, in other words parasitic radio waves, in addition to the radio wave at the fundamental frequency $f_F$. Said radio waves at the parasitic frequencies are propagated throughout the electronic circuit, said circuit generally consisting of a printed circuit, said waves being propagated through the copper tracks of the printed circuit, making the printed circuit resonant at the parasitic frequencies.

These parasitic radio waves may interfere with other on-board electronic equipment in the motor vehicle and may affect its operation.

The acceptable frequencies of on-board radiofrequency transmission devices D in motor vehicles are defined by the current national regulations in force in each country.

If said radiofrequency transmission devices D transmit radio waves at frequencies which are not legally authorized, the motor vehicle can no longer be officially approved.

It is therefore essential to prevent the transmission of these parasitic radio waves by the radiofrequency transmission device D.

For this purpose, according to the prior art, the filtering means 30 comprise a band-pass filter, generally in the form of an electronic circuit comprising capacitors and coils connected (not shown) in series and/or to the ground. This band-pass filter is matched in order to filter the voltage signals at parasitic frequencies and to allow only the voltage signal S at the predetermined fundamental frequency $f_F$ to pass to the radiofrequency antenna A.

The filtering provided in this way must be impedance matched before being connected to the antenna A. This impedance is adjusted on the basis of the fundamental frequency, by means of the second connected frequency matching unit 40.

However, since this band-pass filter is connected to the ground of the electronic circuit, the voltage signals at parasitic frequencies may be propagated in the ground plane of the radiofrequency transmission device D, which, in turn, then starts to radiate at said parasitic frequencies.

Furthermore, said low-pass filter requires a large number of electronic components, which is costly.

BRIEF SUMMARY OF THE INVENTION

The invention proposes a radiofrequency transmission device which is free of the drawbacks of the prior art, that is to say a device which does not transmit parasitic radio waves. Additionally, the radiofrequency transmission device according to the invention is inexpensive.

The invention therefore proposes a radiofrequency transmission device comprising:

a transmission unit for transmitting a pulsed voltage signal at a predetermined fundamental frequency, generating parasitic voltage signals at frequencies which are multiples of the predetermined fundamental frequency, a radiofrequency antenna, matching means for matching the transmission frequency of the radiofrequency antenna to the predetermined fundamental frequency, filtering means for filtering the parasitic voltage signals, a voltage source, connected to the matching means and supplying voltage to the transmission unit, said device according to the invention being remarkable in that:

the filtering means are electrically connected, on the one hand, to the transmission unit, and, on the other hand, to the matching means, and in that said filtering means comprise:

a number "n" of coils, electrically connected in series with each other, of which (n−1) coils have a natural resonance frequency such that:

$$f_{RLi}=i\times f_F$$

where $f_{RLi}$ is the natural resonance frequency of the i-th coil, i is a number varying from 2 to n, $f_F$ is the predetermined fundamental frequency each having an inductance such that, at the predetermined fundamental frequency, $$L_{TOT}=L_1+L_2+\ldots L_i+\ldots L_n=Z_{TOT}=Z_1+Z_2+\ldots Z_i+\ldots Z_n$$

and $$L_i=Z_i$$

where $L_{TOT}$ is the total inductance of the "n" coils, $L_i$ is the inductance of the i-th coil, $Z_{TOT}$ is the total impedance of the "n" coils, $Z_i$ is the impedance of the i-th coil, n is an integer greater than zero.

In a preferred embodiment of the invention, the filtering means comprise three coils.

Preferably, the predetermined fundamental frequency is in the range from 310 MHz to 434 MHz.

The invention is equally applicable to:

any wheel unit or any "hands free" access badge for accessing a motor vehicle, comprising a radiofrequency transmission device according to any of the characteristics listed above.

Finally, the invention concerns any vehicle comprising a radiofrequency transmission device according to any of the characteristics listed above.

BRIEF DESCRIPTION OF THE DRAWINGS

Other characteristics and advantages of the invention will be apparent from a reading of the following description and from an examination of the appended drawings, in which.

DETAILED DESCRIPTION OF THE PREFERRED EMBODIMENTS

Figure 3:
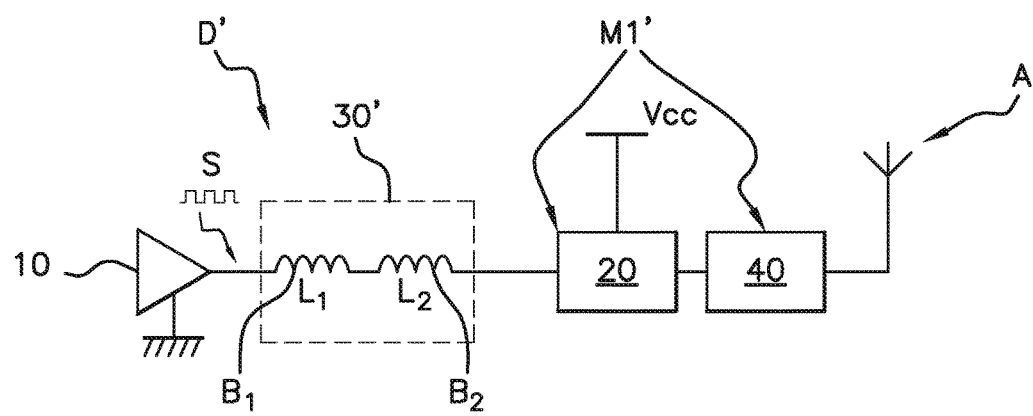
FIG. 3 shows schematically the radiofrequency transmission device D' according to the invention.

The invention proposes a radiofrequency transmission device D', shown in FIG. 3.

The radiofrequency transmission device D' comprises:

a voltage supply source Vcc, which may be, for example, a battery, or the voltage drawn from the vehicle battery, a transmission unit 10 for transmitting a voltage signal S, comprising an oscillator and a power amplifier, matching means M1' for matching the transmission frequency of the antenna A to the fundamental frequency $f_F$, supplied by a voltage source Vcc, and a radiofrequency antenna A connected to the matching means M1.

As explained above, the transmission unit 10 is supplied with voltage by the voltage supply source Vcc, and generates a voltage signal S (see FIG. 3) in the form of successive pulses, that is to say a pulsed voltage signal S, accompanied by the parallel generation of what are known as "harmonic" parasitic currents, that is to say periodic parasitic voltage signals whose frequencies are multiples of the predetermined fundamental frequency $f_F$, that is to say frequencies equal to 2, 3, 4, and 5 times the predetermined fundamental frequency $f_F$.

In order to overcome this drawback, the radiofrequency transmission device D' according to the invention also comprises filtering means 30', electrically connected, on the one hand, to the transmission unit 10 and, on the other hand, to transmission frequency matching means M1'.

Figure 1:
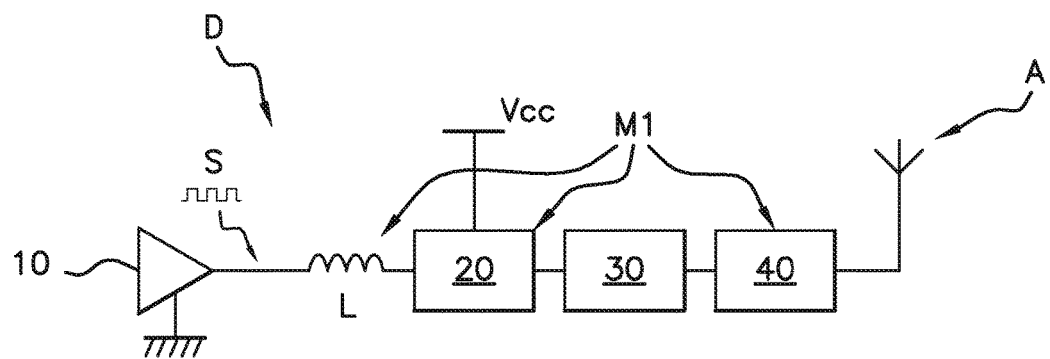
FIG. 1, explained above, shows schematically the radiofrequency transmission device D according to the prior art, FIG. 2, explained above, shows schematically the first matching unit 20.
Figure 2:
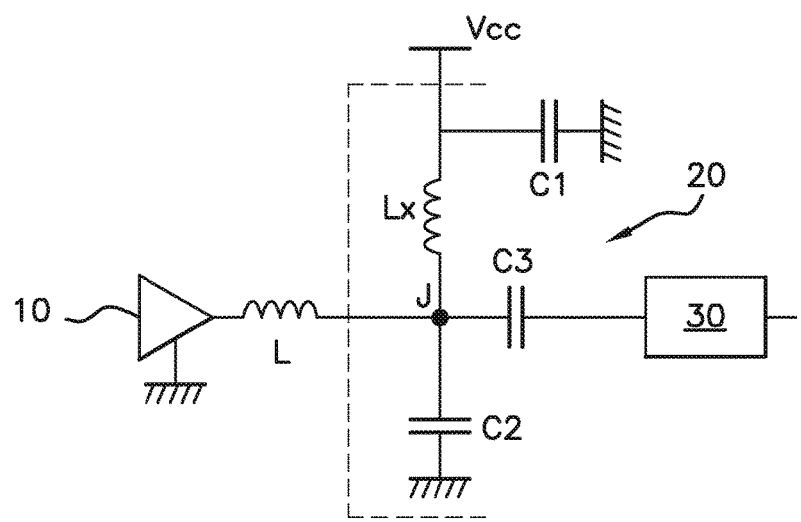

According to the invention, the matching means M1' comprise:

a first matching unit 20 for matching the frequency of the power amplifier of the transmission unit 10 to the fundamental frequency $f_F$, supplied by the voltage source Vcc and connected, on the one hand, to said filtering means 30', and, on the other hand, to a second matching unit 40. Said first matching unit 20 generally comprises (see FIG. 2), as in the prior art, at least a first matching capacitor C1 connected to the supply source Vcc and to the ground, a coil Lx connected to the supply source Vcc and to a junction point J, a second matching capacitor C2 connected to the junction point J and to the ground, and a third capacitor C3 connected to the junction point J and to the input of the second matching unit 40, a second matching unit 40 for matching the transmission frequency of the antenna A, connected to the output of the first matching unit 20, comprising one or more matching capacitors (not shown), and connected electrically to the radiofrequency antenna A.

Figure 4:
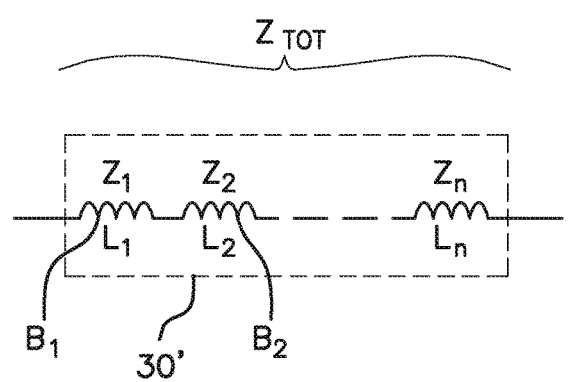
FIG. 4 shows schematically the filtering means 30' according to the invention.

The filtering means 30' according to the invention comprise "n" coils $B_1, B_2, \ldots B_i, \ldots B_n$, electrically connected in series (see FIG. 4) with each other.

Advisably, according to the invention, "(n−1)" coils, for example $B_2, B_3, \ldots B_i, \ldots B_n$, each have an inductance $L_i$, having a natural resonance frequency $f_{RLi}$ corresponding to a harmonic of the predetermined fundamental frequency $f_F$. More particularly:

$$f_{RLi} = i \times f_F$$

where $f_{RLi}$, is the natural resonance frequency of the i-th inductance, i is a number varying from 2 to n, $f_F$ is the predetermined fundamental frequency.

In other words, each of the "(n−1)" coils resonates at a frequency equal to a harmonic of the predetermined fundamental frequency $f_F$, that is to say at one of the parasitic frequencies. This has the effect of attenuating the intensity of said harmonics.

Advantageously, each of the n coils has an impedance value Zi such that the total sum $Z_{TOT}$ of the impedance values (Zi) of the filtering means 30' measured at the predetermined fundamental frequency $f_F$ is equal to the total sum of the values of inductance $L_{TOT}$:

$$Z_{TOT} = Z_1 + Z_2 + \ldots Z_i + \ldots Z_n = L_1 + L_2 + \ldots L_i + \ldots L_n$$

where $Z_{TOT}$ is the total impedance of the "n" coils, measured at the predetermined fundamental frequency $f_F$, $Z_i$ is the impedance of the "i-th" coil $B_i$, $L_{TOT}$ is the total inductance of the "n" coils, $L_i$ is the inductance of the "i-th coil" $B_i$.

The "n−1" coils $B_2, B_3, B_4 \ldots B_n$ then serve to filter the parasitic frequencies without modifying the value of the total impedance $Z_{TOT}$ of the network formed by the "n" coils of the filtering means M1', which remains equal to the impedance $Z_{TOT}$ measured at the predetermined fundamental frequency $f_F$.

This is because, for each coil $B_i$, the impedance $Z_i$ of said coil tends toward infinity, when measured at the resonance frequency $f_{RLi}$, which is natural to said coil; that is to say, $Z_i = \infty$ measured at the resonance frequency $f_{RLi}$ of the coil $B_i$.

However, at the predetermined fundamental frequency $f_F$, which is the operating frequency of the filtering means 30', the impedance $Z_i$ of each coil $B_i$ is equal to its inductance $L_i$, and therefore:

$$Z_i = L_i$$

For its part, the remaining coil, for example the first coil $B_1$, does not have an inductance $L_1$ whose resonance frequency is equal to a multiple of the predetermined fundamental frequency $f_F$.

The remaining coil, that is to say the first coil $B_1$, has an impedance $Z_1$, such that it satisfies the equation $$Z_1 = Z_{TOT} - Z_2 - \ldots Z_i - \ldots Z_n$$

where $Z_{TOT}$ is the total impedance of the "n" coils, measured at the predetermined fundamental frequency $f_F$, Zi is the impedance of the "i-th" coil, and an inductance $L_1$ such that, at the predetermined fundamental frequency $f_F$, there is an inductance $L_1$ which is equal to the impedance $Z_1$:

$$L_1 = Z_1$$

Thus the parasitic frequencies are filtered by means of the (n−1) coils $B_1 \ldots B_n$ of the filtering means 30', and are no longer propagated in the transmission device D', as was the case in the prior art.

With the radiofrequency transmission device D' according to the invention, therefore, the radiofrequency antenna A transmits at the predetermined fundamental frequency $f_F$, and does not transmit radio waves at the parasitic frequencies.

Additionally, the electronic circuit no longer transmits radio waves at the parasitic frequencies via the ground planes or the copper tracks of its constituent printed circuit, as was the case in the prior art.

Figure 5:
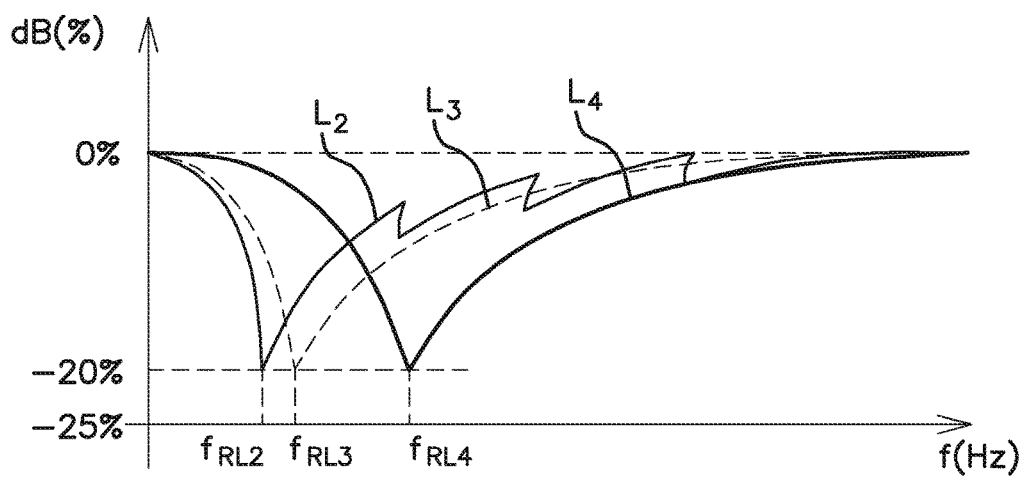
FIG. 5 shows in graphic form the attenuation of the intensity of radiofrequency transmission at the resonance frequencies corresponding to the inductances of the coil, according to the invention.

FIG. 5 shows the frequency amplitude reduction of the coils $B_2, B_3, B_4$ as a function of their inductance $L_2, L_3$ and $L_4$.

The greatest frequency amplitude reduction is obtained at the resonance frequency $f_{RL2}, f_{RL3}, f_{RL4}$ of said coils $B_2, B_3, B_4$.

According to the invention, the inductances $L_2, L_3, L_4$ of the coils are selected in such a way that their natural resonance frequencies $f_{RL2}, f_{RL3}, f_{RL4}$ are substantially equal to the parasitic frequencies transmitted by the transmission unit 10.

Figure 6:
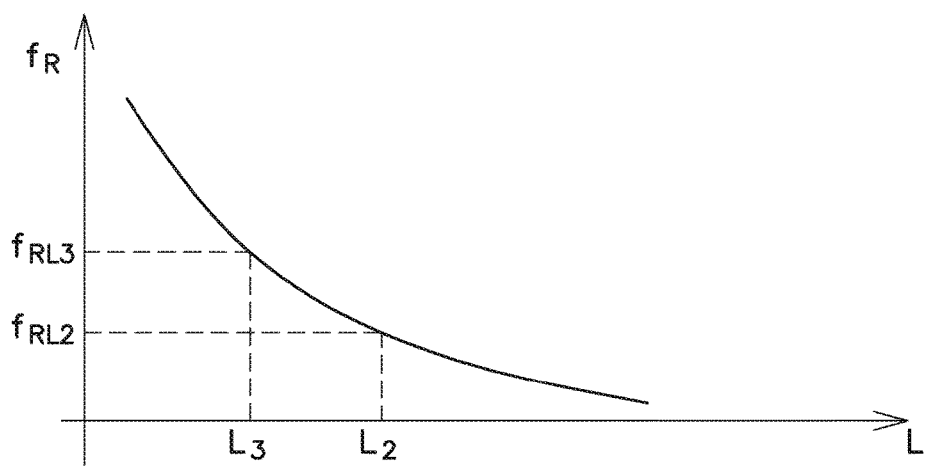
FIG. 6 shows in graphic form the resonance frequency of the coils according to the value of the inductance of said coils, according to the invention.

FIG. 6 shows the curve of the resonance frequency $f_R$ of the coils as a function of their inductance L.

For example, in the case where n=3, for the second coil $B_2$, the inductance $L_2$ is selected in such a way that the resonance frequency of said second coil $B_2$ is equal to twice the predetermined fundamental frequency $f_F$, and therefore:

$$f_{RL2} = 2 \times f_F$$

Similarly, for the third coil $B_3$, the inductance $L_3$ is selected in such a way that the resonance frequency of the third coil $B_3$ is equal to three times the predetermined fundamental frequency $f_F$, i.e.:

$$f_{RL3} = 3 \times f_F$$

For a given inductance $L_i$, the impedance $Z_i$ is determined as follows: $Z_i = L_i$ when the impedance $Z_i$ is measured at the predetermined fundamental frequency $f_F$.

Therefore $Z_2 = L_2$ at the predetermined fundamental frequency $f_F$ and $Z_3 = L_3$ at the predetermined fundamental frequency $f_F$.

Then, a predetermined fundamental frequency $f_F$ corresponds to a total impedance $Z_{TOT}$ of the filtering means M1', that is to say the total impedance of the three-coil network, where $Z_{TOT} = L_{TOT}$ at said predetermined fundamental frequency $f_F$.

The impedance $Z_1$ of the first coil $B_1$ is then selected in such a way that:

$$Z_1 = Z_{TOT} - Z_2 - Z_3$$

The inductance $L_1$ of the first coil $B_1$ is then a function of the impedance $Z_1$, where $L_1 = Z_1$ at the predetermined fundamental frequency $f_F$.

Thus, with the filtering means 30' according to the invention, a network of "n" coils can be used to filter the parasitic frequencies transmitted by the transmission unit 10 by a careful selection of the characteristics (impedance, inductance) of said coils as a function of the predetermined fundamental frequency.

The transmission device D' according to the invention no longer resonates at the parasitic frequencies, and the antenna A transmits radio waves at the desired transmission frequency only.

The invention claimed is:

1. A radiofrequency transmission device comprising:
   a transmission device configured to transmit a pulsed voltage signal at a predetermined fundamental frequency ($f_F$), generating parasitic voltage signals at frequencies which are multiples of the predetermined fundamental frequency ($f_F$);

a radiofrequency antenna;

a matching system configured to match the transmission frequency of the antenna to the value of the predetermined fundamental frequency ($f_F$);

a filter configured to filter the parasitic voltage signals, the filter being electrically connected to the transmission unit and the matching system;

a voltage source, connected to the matching system and supplying voltage to the transmission device, wherein the filter comprises:
- a number "n" of coils ($B_1, B_2, B_i \ldots B_n$), electrically connected in series with each other, of which (n−1) coils ($B_2, B_3, B_4, \ldots B_n$) each have an inductance ($L_i$) such that, at the predetermined fundamental frequency ($f_F$), each of the (n−1) coil have a natural resonance frequency ($F_{RLi}$) equal to:

$$f_{RLi} = i \times f_F$$

where
$f_{RLi}$ is the natural resonance frequency of the i-th coil ($B_i$),
i is a number varying from 2 to n,
$f_F$ is the predetermined fundamental frequency, and
such that each coil of the "n" coils has an impedance equal to:

$$Z_i = K \times L_i$$

where $$K = j \times \omega,$$

with:

$$\omega = 2 \times \pi \times f_F$$

and such that for all of the "n" coils:

$$Z_{TOT} = (Z_1 + Z_2 + \ldots + Z_i + \ldots Z_n) = K \times L_{TOT} = K \times (L_1 + L_2 + \ldots + L_i + \ldots L_n)$$

with:
$L_{TOT}$ being the total inductance of the "n" coils (H),
$L_i$ being the inductance of the i-th coil (H),
$Z_{TOT}$ being the total impedance of the "n" coils (Ω),
$Z_i$ being the impedance of the i-th coil (Ω),
n being an integer greater than zero,
$f_F$ being the predetermined fundamental frequency (Hz),
j being the complex part,
π being equal to 3.14, and
ω being the angular speed.

2. The radiofrequency transmission device according to claim 1, wherein the filter comprises three coils.

3. The radiofrequency transmission device according to claim 1, wherein the predetermined fundamental frequency (fF) is in the range from 310 MHz to 434 MHz.

4. A wheel unit, comprising:
the radiofrequency transmission device according to claim 1.

5. A hands free access badge for accessing a motor vehicle, comprising:
the radiofrequency transmission device according to claim 1.

6. A motor vehicle, comprising:
the radiofrequency transmission device according to claim 1.

* * * * *